(12) United States Patent
Miyazaki

(10) Patent No.: US 10,235,613 B2
(45) Date of Patent: Mar. 19, 2019

(54) IMAGE FORMING DEVICE AND CONTROL METHOD THEREFOR FOR MANAGING CHARACTERISTICS USING A PAPER PROFILE FUNCTION

(71) Applicant: KONICA MINOLTA, INC., Chiyoda-ku, Tokyo (JP)

(72) Inventor: Ken Miyazaki, Sagamihara (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 0 days.

(21) Appl. No.: 15/677,553

(22) Filed: Aug. 15, 2017

(65) Prior Publication Data
US 2018/0053076 A1 Feb. 22, 2018

(30) Foreign Application Priority Data

Aug. 16, 2016 (JP) ................. 2016-159443

(51) Int. Cl.
*G03G 15/00* (2006.01)
*G06K 15/00* (2006.01)
*G06K 15/14* (2006.01)

(52) U.S. Cl.
CPC ....... *G06K 15/4065* (2013.01); *G03G 15/502* (2013.01); *G03G 15/5016* (2013.01); *G06K 15/005* (2013.01); *G06K 15/14* (2013.01); *G06K 15/408* (2013.01); *G03G 15/6508* (2013.01)

(58) Field of Classification Search
None
See application file for complete search history.

(56) References Cited

U.S. PATENT DOCUMENTS

| 8,736,904 | B2* | 5/2014 | Miyazaki | H04N 1/6033 347/104 |
| 8,953,221 | B2* | 2/2015 | Tanaka | H04N 1/6033 358/1.9 |
| 9,223,276 | B2* | 12/2015 | Anno | G03G 15/502 |
| 2005/0105924 | A1* | 5/2005 | Suzuki | G03G 15/235 399/45 |
| 2006/0262337 | A1* | 11/2006 | Kamata | G06F 3/1211 358/1.13 |
| 2007/0230972 | A1* | 10/2007 | Akashi | G03G 15/55 399/16 |
| 2009/0009783 | A1* | 1/2009 | Negishi | G03G 15/5095 358/1.9 |
| 2009/0257088 | A1* | 10/2009 | Tokashiki | G06K 15/00 358/1.15 |
| 2011/0210508 | A1* | 9/2011 | Nakamura | B41J 13/0036 271/279 |

(Continued)

FOREIGN PATENT DOCUMENTS

JP 2013-052597 A 3/2013

*Primary Examiner* — Miya J Williams
(74) *Attorney, Agent, or Firm* — Buchanan Ingersoll & Rooney PC

(57) ABSTRACT

An image forming device having a paper profile function of managing characteristics of paper to be used, thereby enabling to set image quality/portability that are dependent on the paper, includes: a display that displays a paper-profile call screen; and a hardware processor that causes the display to differently display items of the paper-profile call screen between at the time of job setting in which a kind of paper is set and at the time of tray setting in which a tray is set.

12 Claims, 14 Drawing Sheets

(56) References Cited

U.S. PATENT DOCUMENTS

| 2014/0002861 A1* | 1/2014 | Kuwahara | H04N 1/00233 |
| | | | 358/1.15 |
| 2014/0029055 A1* | 1/2014 | Shimura | G06K 15/40 |
| | | | 358/1.16 |
| 2014/0268234 A1* | 9/2014 | Iida | G06K 15/4065 |
| | | | 358/1.15 |

* cited by examiner

FIG. 11

| | MACHINE STATE | JOB LIST | READ | SAVE | COPY | SCAN | | |
|---|---|---|---|---|---|---|---|---|
| | PRINTING CAN BE PERFORMED | | | | ORIGINAL DOCUMENT COUNTER | 0 | REMAINING MEMORY CAPACITY | 99.999% |
| | | | | | NUMBER OF RESERVED JOBS | 0 | REMAINING FILE SYSTEM CAPACITY | 99.414% |
| | | | | | | | SCANNER CAN BE USED | |
| | | | | | | | SAMPLE PAPER DISCHARGE OUTPUT | |

JOB
| NO. | MODE | STATE | TIME (MINUTE) | USER NAME |
|---|---|---|---|---|
| | | | | |

| TRAY | SIZE (mm) | JOB NAME | BASIC WEIGHT |
|---|---|---|---|
| 1 | A4 | STANDARD PAPER | 81–91g/m² |
| 2 | B4 | STANDARD PAPER | 81–91g/m² |
| 3 | 8.5×11 | STANDARD PAPER | 62–74g/m² |
| 4 | 8.5×11 | STANDARD PAPER | 62–74g/m² |
| 5 | 12×18 | STANDARD PAPER | 62–74g/m² |
| | | | |

SUPPLY/WASTE MEMBER
- ○ TONER Y    ○ TONER M
- ○ TONER C    ○ TONER K
- ○ WASTE TONER BOX

| OUTSIDE AIR TEMPERATURE : 0°C | OUTSIDE AIR HUMIDITY : 0% |
|---|---|
| FRONT AND BACK ADJUSTMENT | ADJUSTMENT | CONTROLLER SETTING | SAMPLE PAPER DISCHARGE SETTING |

PAPER SETTING   15:00   PRINT DATA CAN BE RECEIVED

| PAPER PROFILE NAME | | | | |
|---|---|---|---|---|
| PAPER SIZE | A4 | | | |
| KIND OF PAPER | STANDARD | | | |
| BASIC WEIGHT | 81 – 91g/m² | | | |
| SPEED SETTING | AUTOMATIC SWITCHING | | | |
| COLOR OR PAPER | WHITE | | | |
| PUNCH | NO PUNCHED HOLE | | | |
| | --- | --- | | |
| THICKNESS | NOT SPECIFIED | | | |
| | --- | --- | | |

| | MAGNIFICATION RATIO | FRONT SIDE SURFACE | BACK SIDE SURFACE |
|---|---|---|---|
| | VERTICAL MAGNIFICATION RATIO | +0.00 | +0.00 |
| | HORIZONTAL MAGNIFICATION RATIO | +0.00 | +0.00 |
| | UP-AND-DOWN | +0.0 | +0.0 |
| | RIGHT-AND-LEFT | +0.0 | +0.0 |
| | ROTATION | --- | --- |
| | Skew | --- | --- |

EXPERT ADJUSTMENT

| | FRONT SIDE SURFACE | BACK SIDE SURFACE |
|---|---|---|
| SECONDARY TRANSFER OUTPUT ADJUSTMENT | +0 | +0 |
| SECONDARY TRANSFER OUTPUT – FRONT END ADJUSTMENT | +0 | +0 |
| SECONDARY TRANSFER OUTPUT – REAR END ADJUSTMENT | +0 | +0 |
| SEPARATION DC | +0 | +0 |
| SEPARATION AC | +0 | +0 |

| | | |
|---|---|---|
| FIXING UPPER ROLLER TEMPERATURE | FIXING LOWER ROLLER TEMPERATURE | +0 |
| FRONT END ERASE AMOUNT | REAR END ERASE AMOUNT | +0 |
| | INVERTED PAPER DISCHARGE TIMING ADJUSTMENT | +0 |
| | ADU INVERTED TIMING ADJUSTMENT | +0 |
| | FIXING SPEED ADJUSTMENT (FRONT SIDE SURFACE) | +0 |
| | FIXING SPEED ADJUSTMENT (BACK SIDE SURFACE) | +0 |
| | RESIST LOOP AMOUNT (FRONT SIDE) | +0 |
| DIFFERENCE IN TEMPERATURE BETWEEN THE FIXING END PART AND THE CENTRAL PART | RESIST LOOP AMOUNT (BACK SIDE) | +0 |
| | INCREASE THE FIXING INITIAL TEMPERATURE | AUTOMATIC |

IMAGE FORMING DEVICE AND CONTROL METHOD THEREFOR FOR MANAGING CHARACTERISTICS USING A PAPER PROFILE FUNCTION

Japanese Patent Application No. 2016-159443 filed on Aug. 16, 2016, including description, claims, drawings, and abstract the entire disclosure is incorporated herein by reference in its entirety.

BACKGROUND

Technological Field

The present invention relates to an image forming device, and a method for controlling the image forming device.

Description of the Related Art

An image forming device such as a copying machine, a printer device, a facsimile device, a printing machine and a multifunction machine has a paper profile function of managing characteristics of paper to be used by using a database, thereby enabling to easily set image quality/portability that are dependent on paper (refer to, for example, JP 2013-52597 A).

This paper profile is formed mainly by a combination of a paper profile name, a kind of paper, and a basic weight. Above all, an on-demand machine intended for commercial printing use is configured to be capable of fine settings, for example, front and back paper adjustment, process adjustment such as transfer and fixing. High image quality and high productivity are ensured by having a paper profile function.

With respect to commercial printing that prints a commercial product such as a catalogue, a poster and a direct mail, a printing step is divided into a prepress step for creating a job (print data), and a press step for performing final printing. In addition, a person in charge of prepress records a printing method and paper information, which are received from a client, in a print instruction form. More specifically, 1. An optimum paper profile is searched for and set on the basis of a request from the client, and a job having the received paper information is generated. Subsequently, the job is transmitted (print instruction) to a main body of an image forming device.

2. A print instruction form is transmitted to an exclusive machine operator called a machine manager. The machine manager loads (supplies), into a tray, sheets of paper described in the print instruction form, and applies a paper profile that is fitted to the temperature and the humidity, and is described in the print instruction form, to tray setting.

Incidentally, in general, approximately three hundred to five hundred kinds of paper profiles for commercial use are managed. Therefore, it is considered that a wrong paper profile may be specified at the time of job setting or tray setting by mistake. This is an operating error caused by a difference in required paper-profile search function between a person in charge of prepress and a machine manager. When a wrong paper profile is specified at the time of job setting or tray setting by mistake, there is a higher possibility that the image quality and the portability will deteriorate. Therefore, a printed matter cannot be used as a commercial product, and the wrong paper profile will lead to a waste of time and paper.

SUMMARY

Accordingly, an object of the present invention is to provide an image forming device and a method for controlling the image forming device.

To achieve the abovementioned object, according to an aspect of the present invention, there is provided an image forming device having a paper profile function of managing characteristics of paper to be used, thereby enabling to set image quality/portability that are dependent on the paper, and the image forming device reflecting one aspect of the present invention comprises:

a display that displays a paper-profile call screen; and a hardware processor that causes the display to differently display items of the paper-profile call screen between at the time of job setting in which a kind of paper is set and at the time of tray setting in which a tray is set.

BRIEF DESCRIPTION OF THE DRAWING

The advantages and features provided by one or more embodiments of the invention will become more fully understood from the detailed description given hereinbelow and the appended drawings which are given by way of illustration only, and thus are not intended as a definition of the limits of the present invention:

FIG. 11 is a drawing illustrating a top screen of tray setting at the time of tray setting;

FIG. 12 is a drawing illustrating a tray setting screen at the time of tray setting;

DETAILED DESCRIPTION OF EMBODIMENTS

Figure 1:
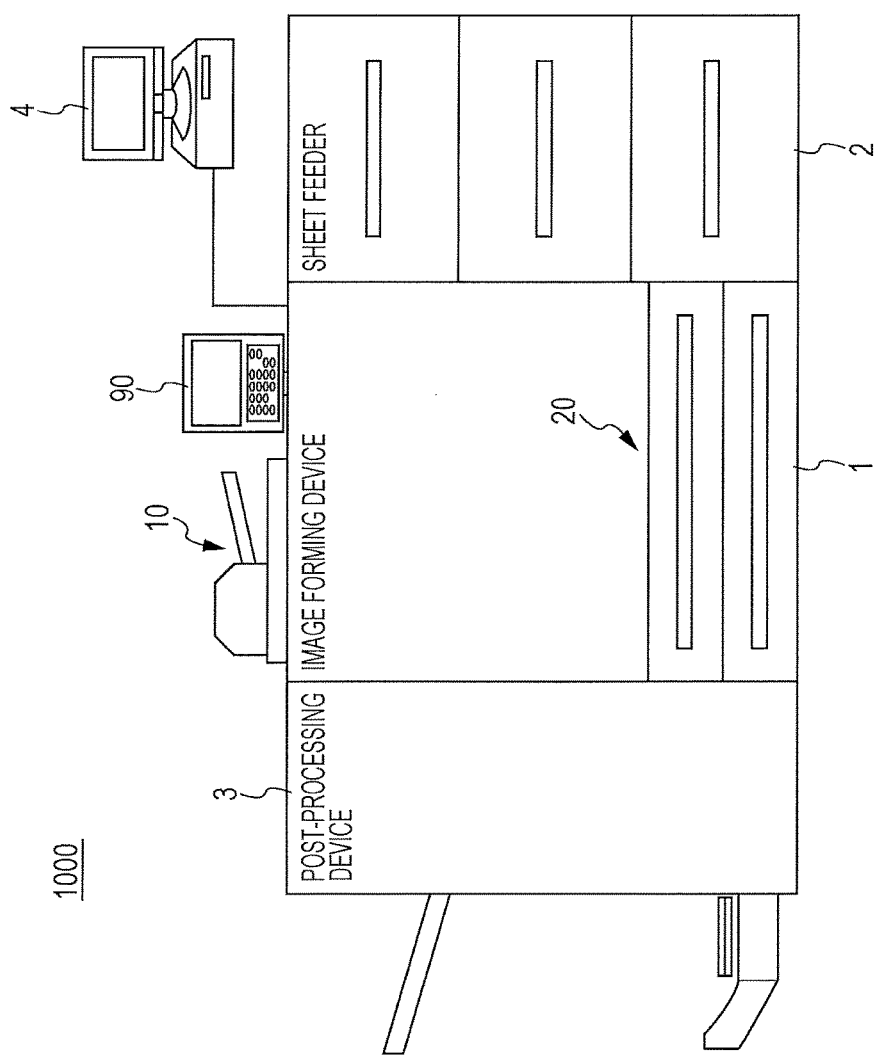
FIG. 1 is a system configuration diagram schematically illustrating a configuration of an image forming system to which the present invention is applied.

Hereinafter, modes for carrying out the present invention (hereinafter referred to as "embodiments") will be described in detail with reference to the drawings. However, the scope of the invention is not limited to the disclosed embodiments. It should be noted that in the following description and each drawing, the same element, or an element having the same function, uses the same reference numeral, and overlapping explanation will be omitted.

[Image Forming System to Which the Present Invention is Applied]

FIG. 1 is a system configuration diagram schematically illustrating a configuration of an image forming system to which the present invention is applied. As shown in FIG. 1, an image forming system 1000 according to the present application example has a system configuration including an image forming device 1, a sheet feeder 2, a post-processing device 3, and an external device 4.

The image forming device 1 is an image forming device according to an embodiment of the present invention. Further information about a configuration thereof and the like will be described in detail later. The sheet feeder 2 is provided separately from a paper storage unit 20 that is built into the image forming device 1. The sheet feeder 2 is a large-capacity sheet feeder that supplies various kinds of recording media to the image forming device 1. The post-processing device 3 is a device that subjects sheets of paper output from the image forming device 1 to post-processing such as staple processing.

The external device 4 is funned of, for example, a personal computer (PC), and supplies image data to the image forming device 1. Here, a personal computer is presented as the external device 4. However, the external device 4 is not limited to the personal computer. Thus, other various kinds of devices, for example, a facsimile device, can be applied to the external device 4.

(Configuration Example of Image Forming Device)

Figure 2:
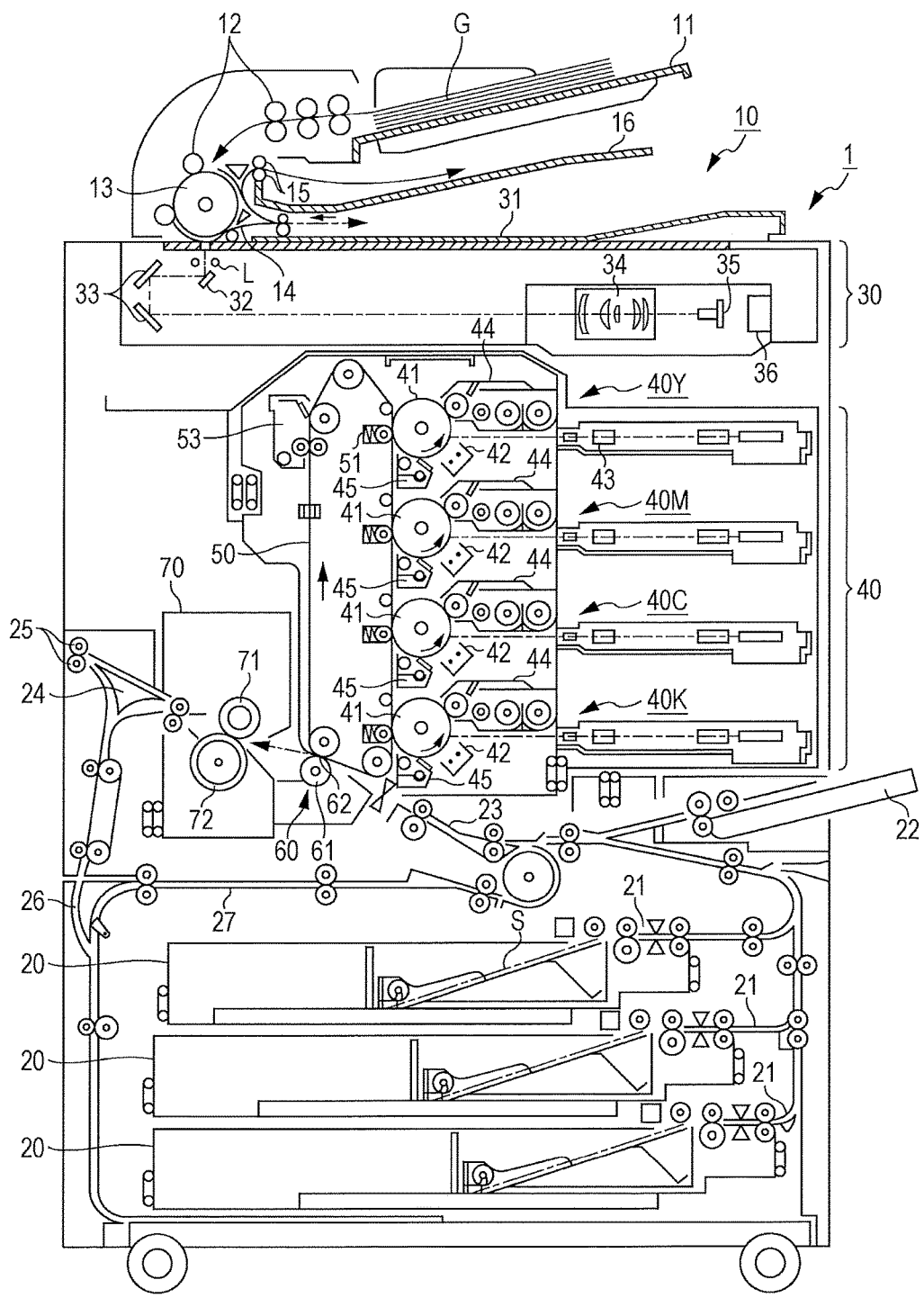
FIG. 2 is an overall configuration diagram schematically illustrating a system configuration of an image forming device according to an embodiment of the present invention.

FIG. 2 is an overall configuration diagram schematically illustrating a system configuration of an image forming device according to an embodiment of the present invention. In the present embodiment, a case where the system configuration is applied to a copying machine is taken as an example.

The image forming device 1 according to the present embodiment employs an electrophotographic method that forms an image on a recording media such as a sheet of paper (hereinafter referred to as "sheets of paper S") by using static electricity. The image forming device 1 is a tandem type color image forming device that superimposes toners of four respective colors, that is to say, yellow (Y), magenta (M), cyan (C) and black (K). The image forming device 1 according to the present embodiment is configured to include an original-document conveying unit 10, paper storage units 20, an image reading unit 30, an image forming unit 40, an intermediate transfer belt 50, a secondary transfer unit 60, and a fixing unit 70.

The original-document conveying unit 10 includes an original-document feeding table 11 on which original documents G are loaded, a plurality of rollers 12, a conveying drum 13, a conveying guide 14, an original-document discharge roller 15, and an original-document discharge tray 16. The plurality of rollers 12 and the conveying drum 13 convey the original documents G, which are loaded on the original-document feeding table 11, to a reading position of the image reading unit 30 one by one. The conveying guide 14 and the original-document discharge roller 15 discharge the original documents G, which have been conveyed by the plurality of rollers 12 and the conveying drum 13, to the original-document discharge tray 16.

The paper storage units (what is called trays) 20 are disposed in the lower part of the device body, and each store sheets of paper S. Two or more paper storage units 20 are provided according to the size and kind of the sheets of paper S. A feeding unit 21 feeds and carries each of the sheets of paper S stored in the paper storage unit 20 to a conveying unit 23. The conveying unit 23 then conveys the each of the sheets of paper S to a secondary transfer unit 60 that is located at a transfer position. In addition, a hand feed unit 22 is provided in proximity to the paper storage unit 20. Special recording media are loaded into the hand feed unit 22 by a user. The special recording media include sheets of paper, the size of which is not covered by the paper storage unit 20, tag paper having a tag, and OHP sheets. Subsequently, the recording media loaded into the hand feed unit 22 are each carried to a transfer position by the conveying unit 23.

The image reading unit 30 reads an image of each of the original documents G conveyed by the original-document conveying unit 10 or an image of an original document placed on an original document table 31 to generate image data. More specifically, the image of the each of the original documents G is radiated with light of a lamp L. Reflected light of the irradiation light from the lamp L, which is reflected by the each of the original documents G, is introduced into a first mirror unit 32, a second mirror unit 33 and a lens unit 34 in this order, and is then imaged on a light receiving surface of an image pickup element 35. The image pickup element 35 photoelectrically converts the incident light, and outputs a predetermined image signal. The image signal output from the image pickup element 35 is then subjected to AD conversion so as to generate image data.

The image reading unit 30 includes an image reading controller 36. The image reading controller 36 subjects the image data generated by the AD conversion to well-known image processing such as shading correction, dither processing and compression. It should be noted that the image data is not limited to data output from the image reading unit 30, and therefore the image data may be data received from the external device 4 (refer to FIG. 1) connected to the image forming device 1.

The image forming unit 40 and the intermediate transfer belt 50 are disposed below the image reading unit 30 and above the paper storage units 20. In order to form a toner image composed of yellow (Y), magenta (M), cyan (C) and black (K), the image forming unit 40 includes a first image forming unit 40Y, a second image forming unit 40M, a third image forming unit 40C, and a fourth image forming unit 40K.

The first image forming unit 40Y forms a yellow toner image, and the second image forming unit 40M forms a magenta toner image. In addition, the third image forming unit 40C forms a cyan toner image, and the fourth image forming unit 40K forms a black toner image. These four image forming units 40Y, 40M, 40C, 40K each have the same configuration. Therefore, the first image forming unit 40Y will be described here.

The first image forming unit 40Y includes a drum-shaped photoreceptor (photoreceptor drum) 41, a charging part 42 arranged around the photoreceptor 41, an exposure part 43, a development part 44, and a cleaning part 45. Driving of a drive motor (not illustrated) causes the photoreceptor 41 to rotate. The charging part 42 provides the photoreceptor 41 with electrical charge to uniformly charge a surface of the photoreceptor 41. The exposure part 43 exposes the surface of the photoreceptor 41 to, for example, a laser beam to form an electrostatic latent image on the photoreceptor 41 on the basis of image data read from each of the original documents G or image data transmitted from the external device 4.

The development part 44 develops the electrostatic latent image formed on the photoreceptor 41 by using a two-component developer composed of a toner and a carrier. The toner is particles that form an image. The carrier has: a function of providing a toner with proper electrical charge by frictional electrification at the time of mixture with the toner in the development part 44; a function of conveying the toner to a development area that faces the photoreceptor 41; and a function of forming a development field so as to enable the toner to be faithfully developed in the electrostatic latent image on the photoreceptor 41. The development part 44 includes a development sleeve 46 for supplying a developer to the photoreceptor 41. The development part 44 causes the yellow toner to adhere to the electrostatic latent image formed on the photoreceptor 41. As the result, a yellow toner image is formed on the surface of the photoreceptor 41.

It should be noted that the development part 44 of the second image forming unit 40M causes the magenta toner to adhere to the photoreceptor 41, and the development part 44 of the third image forming unit 40C causes the cyan toner to adhere to the photoreceptor 41. In addition, the development part 44 of the fourth image forming unit 40K causes the black toner to adhere to the photoreceptor 41. The cleaning part 45 removes the toner that remains on the surface of the photoreceptor 41.

The toner that adheres to the photoreceptor 41 is transferred to the intermediate transfer belt 50. The intermediate transfer belt 50 is formed in an endless shape, and is hung over a plurality of rollers. Driving of the drive motor (not illustrated) causes the intermediate transfer belt 50 to rotate in a direction reverse to the rotation (movement) direction of the photoreceptor 41.

Primary transfer units 51 are provided at respective positions that face the photoreceptors 41 of the image forming units 40Y, 40M, 40C, 40K respectively in the intermediate transfer belt 50. Applying a voltage, the polarity of which is reverse to that of the toner, to the intermediate transfer belt 50 causes the primary transfer units 51 to transfer the toners, which adhere to the photoreceptors 41 respectively, to the intermediate transfer belt 50.

In addition, when the intermediate transfer belt 50 rotates, respective toner images formed by the four image forming units 40Y, 40M, 40C, 40K are successively transferred to the surface of the intermediate transfer belt 50. As the result, the yellow, magenta, cyan and black toner images are superimposed on the intermediate transfer belt 50, thereby forming a color image.

Further, a belt cleaning unit 53 is provided so as to face the intermediate transfer belt 50. The belt cleaning unit 53 cleans the surface of the intermediate transfer belt 50 that has completed the transfer of the toner image to the sheet of paper S.

A secondary transfer unit 60 is disposed in the vicinity of the intermediate transfer belt 50 and downstream in the paper conveying direction of the conveying unit 23. The secondary transfer unit 60 brings the sheet of paper S conveyed by the conveying unit 23 into contact with the intermediate transfer belt 50, thereby transferring the toner image formed on the outer peripheral surface of the intermediate transfer belt 50 to the sheet of paper S.

The secondary transfer unit 60 includes a secondary transfer roller 61. The secondary transfer roller 61 is provided in a state in which the secondary transfer roller 61 is pressure-welded to an opposite roller 52. In addition, a part in which the secondary transfer roller 61 comes in contact with the intermediate transfer belt 50 becomes a secondary transfer nip part 62. The position of the secondary transfer nip part 62 is a transfer position at which the toner image formed on the outer peripheral surface of the intermediate transfer belt 50 is transferred to the sheet of paper S.

The fixing unit 70 is provided on the discharge side of the sheet of paper S in the secondary transfer unit 60. This fixing unit 70 pressurizes and heats the sheet of paper S so as to fix the transferred toner image to the sheet of paper S. The fixing unit 70 is composed of, for example, a fixing upper roller 71 and a fixing lower roller 72 that are a pair of fixing members. The fixing upper roller 71 and the fixing lower roller 72 are arranged with the fixing upper roller 71 and the fixing lower roller 72 pressure-welded to each other. A fixing nip part is formed as a pressure contact at which the fixing upper roller 71 and the fixing lower roller 72 are pressure-welded to each other.

A heating part is provided inside the fixing upper roller 71. A roller part of the fixing upper roller 71 is warmed by radiant heat from this heating part. Subsequently, the heat of the roller part of the fixing upper roller 71 is transferred to the sheet of paper S, which causes the toner image on the sheet of paper S to be fixed.

The sheet of paper S is conveyed in such a manner that a surface (fixing target surface) to which a toner image has been transferred by the secondary transfer unit 60 faces the fixing upper roller 71. The sheet of paper S passes through the fixing nip part. Therefore, the sheet of paper S that passes through the fixing nip part is pressurized by the fixing upper roller 71 and the fixing lower roller 72, and is heated by the heat of the roller part of the fixing upper roller 71.

A switching gate 24 is disposed downstream in the conveying direction of the sheet of paper S in the fixing unit 70. The switching gate 24 switches a conveyance path of the sheet of paper S that has passed through the fixing unit 70. In other words, when the switching gate 24 performs face-up paper discharge at the time of single-sided image forming on the sheet of paper S, the switching gate 24 causes the sheet of paper S to move in a straight line. As the result, the sheet of paper S is discharged by the pair of paper discharge rollers 25. In addition, when the switching gate 24 performs face-down paper discharge at the time of single-sided image forming on the sheet of paper S, and when the switching gate 24 performs double-sided image forming on the sheet of paper S, the switching gate 24 guides the sheet of paper S downward.

When face-down paper discharge is performed, the sheet of paper S is guided downward by the switching gate 24, and subsequently the sheet of paper S is conveyed upward by a paper inversion conveying unit 26 with the front and back sides of the sheet of paper S inverted. As the result, the sheet of paper S, the front and back sides of which are inverted, is discharged by the pair of paper discharge rollers 25. When double-sided image forming on the sheet of paper S is performed, the sheet of paper S is guided downward by the switching gate 24, and subsequently the front and back sides of the sheet of paper S are inverted by the paper inversion conveying unit 26. The sheet of paper S, the front and back sides of which are inverted, is conveyed to a transfer position again through a paper refeeding path 27.

(Hardware Configuration of Image Forming Device)

Figure 3:
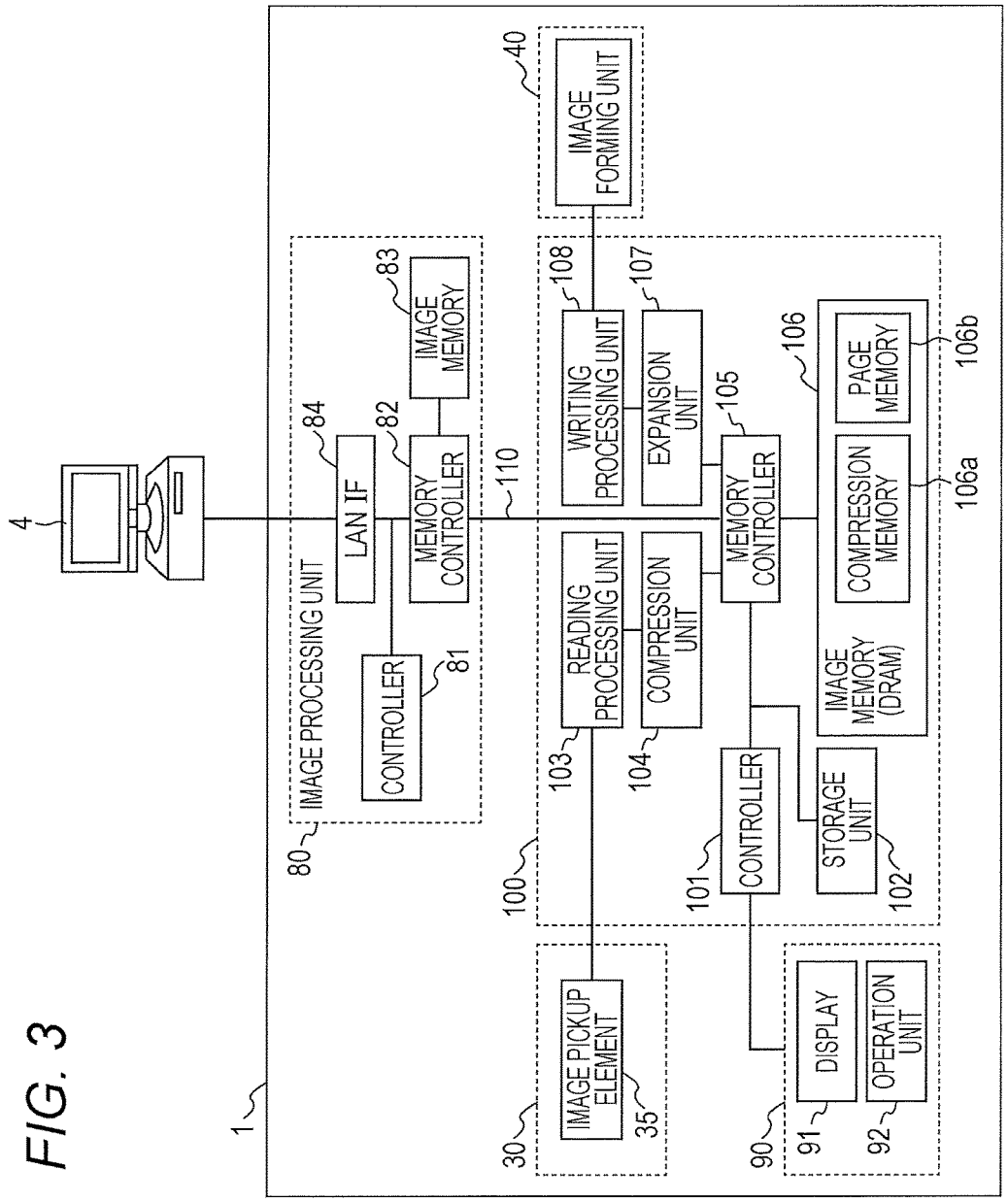
FIG. 3 is a block diagram illustrating an example of a hardware configuration of each part of the image forming device according to an embodiment of the present invention.

Next, a hardware configuration of the image forming device 1 according to the present embodiment will be described with reference to FIG. 3. FIG. 3 is a block diagram illustrating an example of the hardware configuration of the image forming device 1 according to the present embodiment.

As shown in FIG. 3, the image forming device 1 includes the original-document conveying unit 10, the paper storage units 20, the image reading unit 30, the image forming unit 40, the intermediate transfer belt 50, the secondary transfer unit 60, and the fixing unit 70. Other than the above-described components, the image forming device 1 further includes an image processing unit 80, an operation display unit 90, and an image control board 100.

The image processing unit 80 is composed of a controller 81, a memory controller 82, an image memory 83, a local area network interface (LANIF) 84 and the like. The controller 81 controls the operation of each component in the image processing unit 80 in a unified manner, and transmits image data input from the external device (for example, a personal computer) 4 to the image control board 100 through the LANIF 84.

The memory controller 82 controls writing of image data received through the LANIF 84 to the image memory 83, and reading of the image data from the image memory 83. In addition, the memory controller 82 is connected to a memory controller 105 of the image control board 100 through a peripheral component interconnect (PCI) bus 110, and reads printing (image forming) target image data from the image memory 83 to output the image data to the memory controller 105 under the control of the controller 81.

The image memory 83 is formed of, for example, a dynamic random access memory (DRAM), and temporarily stores image data received through the LANIF 84 under the control of the memory controller 82. The LANIF 84 is a communication interface used to connect to a network such as a LAN. The LANIF 84 receives image data from the external device 4, and outputs the received image data to the memory controller 82.

The operation display unit 90 is composed of a display 91 and an operation unit 92. The display 91 includes a liquid crystal display device (LCD), and an organic electro luminescence (EL) display device, and displays, for example, an instruction menu for a user, information about obtained image data. The operation unit 92 is provided with, for example, a touch panel and a plurality of keys, and accepts input of data such as various kinds of instructions, characters and numbers by key operation of the user.

The image control board 100 has, thereon, a controller 101, a storage unit 102, a reading processing unit 103, a compression unit 104, a memory controller 105, an image memory 106, an expansion unit 107, a writing processing unit 108 and the like.

The controller 101 includes a central processing unit (CPU), and reads a program specified from among system programs and various kinds of application programs, which are stored in the storage unit 102, and expands the program in a RAM (not illustrated). In addition, the controller 101 executes various kinds of processing in collaboration with the program expanded in the RAM, thereby controlling each functional part in the image forming device 1 in a centralized manner.

The storage unit 102 is formed of, for example, a non-volatile memory, and stores the system programs, the various kinds of application programs, and the various kinds of data. The system programs and the various kinds of application programs are stored in the storage unit 102 in the form of program codes that can be read from a computer In addition, for the storage unit 102, the controller 101 successively executes the operation according to the program codes.

The reading processing unit 103 corresponds to the above-described image reading controller 36 (refer to FIG. 1). The reading processing unit 103 subjects an analog image signal inputted from the image reading unit 30 to various kinds of processing such as analog signal processing, analogue/digital (A/D) conversion processing, and shading processing, and then outputs obtained data to the compression unit 104 as digital image data. The compression unit 104 subjects the inputted digital image data to compression processing, and then outputs obtained data to the memory controller 105.

The memory controller 105 controls the compression processing of image data by the compression unit 104, and the expansion processing of compressed image data by the expansion unit 107, and performs the control of input/output of image data into/from the image memory 106, under the control of the controller 101. For example, when the controller 101 instructs the memory controller 105 to store image data obtained by reading performed by the image reading unit 30, the memory controller 105 causes the compression unit 104 to execute the compression processing of image data inputted from the reading processing unit 103, and then stores the compressed image data in a compression memory 106a of the image memory 106.

In addition, when the controller 101 instructs the memory controller 105 to print compressed image data stored in the compression memory 106a, the memory controller 105 reads the compressed image data from the compression memory 106a, subjects the compressed image data to expansion processing by using the expansion unit 107, and then stores the expanded image data in a page memory 106b of the image memory 106. In addition, the memory controller 105 reads uncompressed image data from the page memory 106b, and outputs the uncompressed image data to the writing processing unit 108 by means of memory transfer, for example, a direct memory access (DMA) method.

Moreover, the memory controller 105 outputs, to the controller 101, setting information about a job inputted from the image processing unit 80.

The image memory 106 is formed of, for example, a DRAM that is a volatile memory, and includes the compression memory 106a and the page memory 106b. The compression memory 106a is a memory for storing compressed image data obtained by the compression processing by the compression unit 104. The page memory 106b is a memory that temporarily stores, on a page basis, uncompressed image data for image forming, before image forming, the temporarily stored image data having a predetermined data size.

The expansion unit 107 subjects the compressed image data to the expansion processing under the control of the memory controller 105. The writing processing unit 108 generates a pulse width modulation (PWM) signal on the basis of the image data expanded by the expansion unit 107, and then outputs the PWM signal to the image forming unit 40.

[Paper Profile Function]

The image forming device 1 having the above-described configuration according to the present embodiment has a paper profile function of managing characteristics of sheets of paper S to be used by using a database, thereby enabling to easily set image quality/portability that are dependent on the sheets of paper S. The paper profile is configured by a combination of at least a paper profile name, a kind of paper, and a basic weight.

Figure 4:
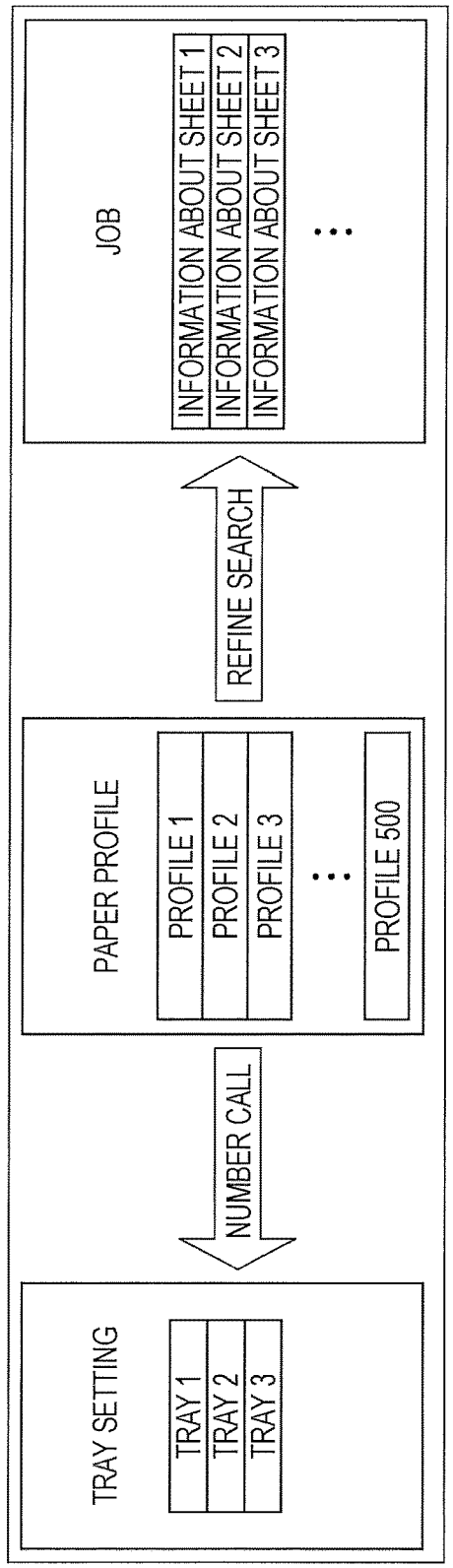
FIG. 4 is an explanatory drawing illustrating the relationship among paper profiles.

Approximately three hundred to five hundred kinds of paper profiles for commercial use are stored in the storage unit 102 (refer to FIG. 3) that is formed of a non-volatile memory built into the image control board 100. FIG. 4 shows the relationship among paper profiles. In the present example, for example, five hundred kinds of profiles 1 to 500 are stored in the storage unit 102.

In a prepress step, a person in charge of prepress refine-searches for an optimum paper profile from among the many kinds of paper profiles on the basis of a request from a client, and sets the optimum paper profile, thereby generating a job having received paper information. Subsequently, the person in charge of prepress transmits the job (print instruction) to the main body of the image forming device 1, and transmits a print instruction form to a machine manager. In a press step, the machine manager applies the paper profile described in the print instruction form to tray setting.

More specifically, with respect to commercial printing that prints a commercial product such as a catalogue, a poster and a direct mail, a person in charge of prepress views a paper-profile call screen displayed on the display 91 (refer to FIG. 3), and from among many kinds of paper profiles, registers a printing method and paper information, which are received from a client, in a print instruction form. Meanwhile, the machine manager views the paper-profile call screen displayed on the display 91, loads, into a tray, sheets of paper described in the printing instruction form, and applies, to the tray setting, a paper profile that is fitted to the temperature and the humidity.

Here, with respect to many kinds of paper profiles (approximately three hundred to five hundred kinds of paper profiles), if the paper-profile call screen at the time of job setting in which the person in charge of prepress sets a kind of paper is the same as the paper-profile call screen at the time of tray setting in which the machine manager sets a tray, there is a concern that a wrong paper profile may be specified at the time of job setting or tray setting by mistake. When a wrong paper profile is specified at the time of job setting or tray setting by mistake, there is a higher possibility that the image quality and the portability will deteriorate. Therefore, a printed matter cannot be used as a commercial product, and the wrong paper profile will lead to a waste of time and paper.

In consideration of the above-described problem, the image forming device 1 according to the present embodiment is configured to differently display items of the paper-profile call screen in the display 91 between at the time of job setting by a person in charge of prepress and at the time of tray setting by a machine manager under the control of the controller 101 on the image control board 100 (refer to FIG. 3). By enabling items of the paper-profile call screen to be differently displayed between at the time of job setting and at the time of tray setting, items suitable for a person in charge of prepress and items suitable for a machine manager, in other words, items that fit for the use, can be independently displayed with respect to approximately three hundred to five hundred kinds of paper profiles that are managed. As the result, the occurrence of an operating error caused by a difference in required paper-profile search function between a person in charge of prepress and a machine manager can be prevented beforehand, and the time taken to select paper can be shortened. Moreover, since an operating error can be prevented beforehand, waste of paper can be suppressed.

Specific processing at the time of job setting and specific processing at the time of tray setting on the paper-profile call screen displayed in the display 91 will be described below. A series of processing is executed under the control of the controller 101 on the image control board 100 (refer to FIG. 3). In addition, FIG. 3 is based on the assumption that the operation display unit 90, which is composed of the display 91 and the operation unit 92, is formed of a touch panel, the paper-profile call screen is displayed on a screen (menu screen) of the touch panel, and a person in charge of prepress and a machine manager are allowed to perform button operation (input operation) on the screen.

(Processing at the Time of Job Setting)

Figure 5:
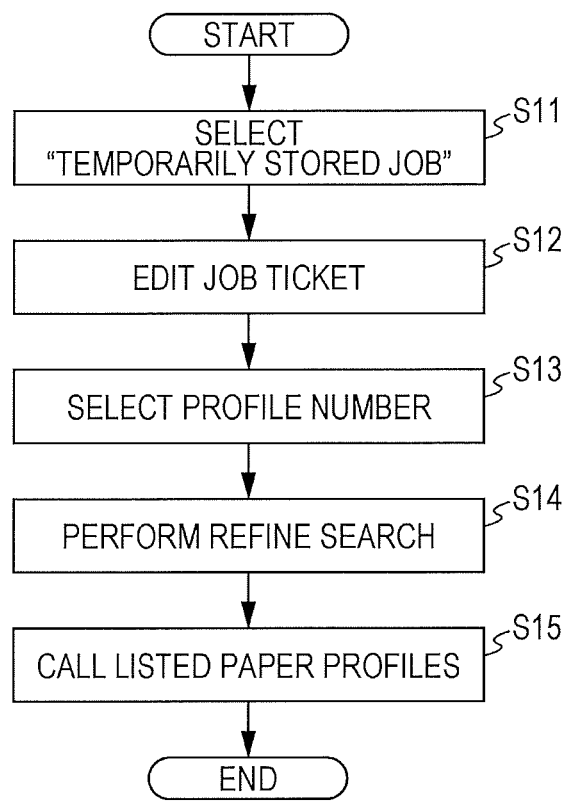
FIG. 5 is a flowchart illustrating the process flow at the time of job setting by a person in charge of prepress.

A process flow at the time of job setting in which a person in charge of prepress sets a kind of paper will be described with reference to a flowchart shown in FIG. 5. A job can be modified at the time of job setting. At the time of job setting, the button operation on the paper-profile call screen is performed by the person in charge of prepress.

Figure 6:
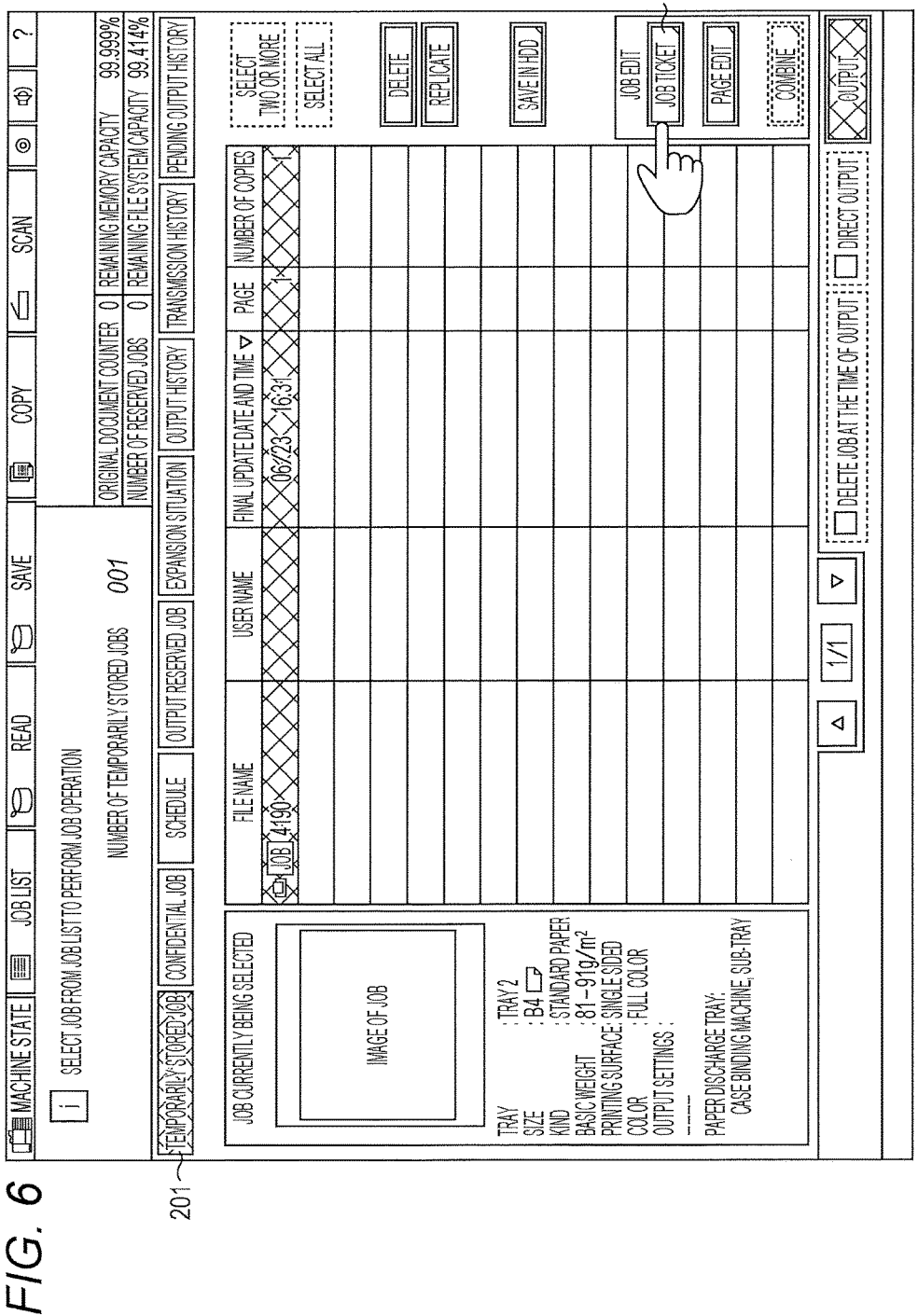
FIG. 6 is a drawing illustrating a top screen of job setting at the time of job setting.

First of all, a job setting top screen shown in FIG. 6 is displayed in the operation display unit 90, and a "Temporarily Stored Job" button 201 located in the upper left of the screen is pressed (selected) on this top screen (step S11). On the left side of the top screen, an image of a job that is currently being selected is displayed together with, for example, "Tray: Tray 2", "Size: B4 Horizontal", "Kind: Standard paper", "Basic weight: 81-91 g/m2", "Printing surface: Single sided", and "Color: Full color".

Figure 7:
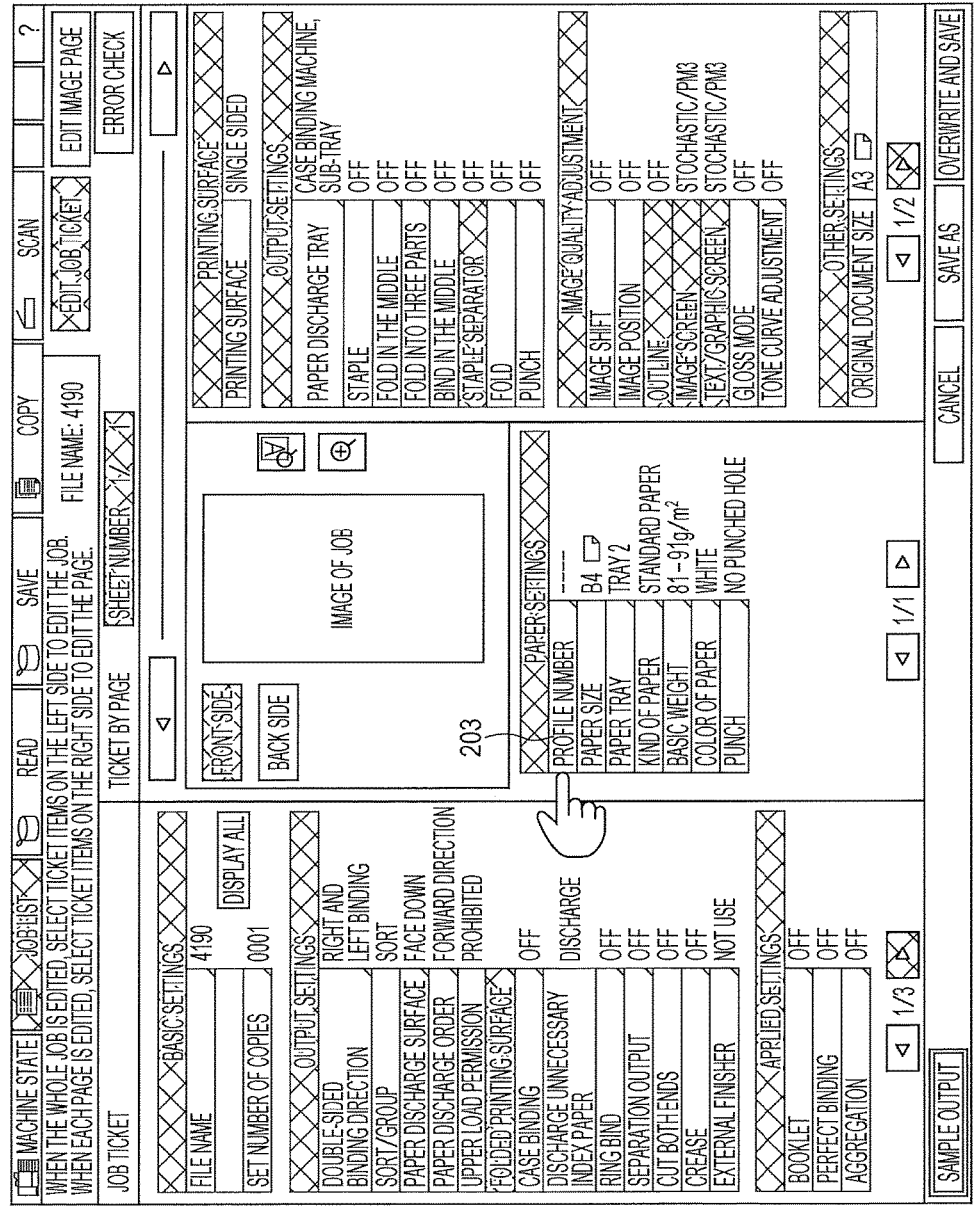
FIG. 7 is a drawing illustrating a job ticket edit screen at the time of job setting.
Figure 8:
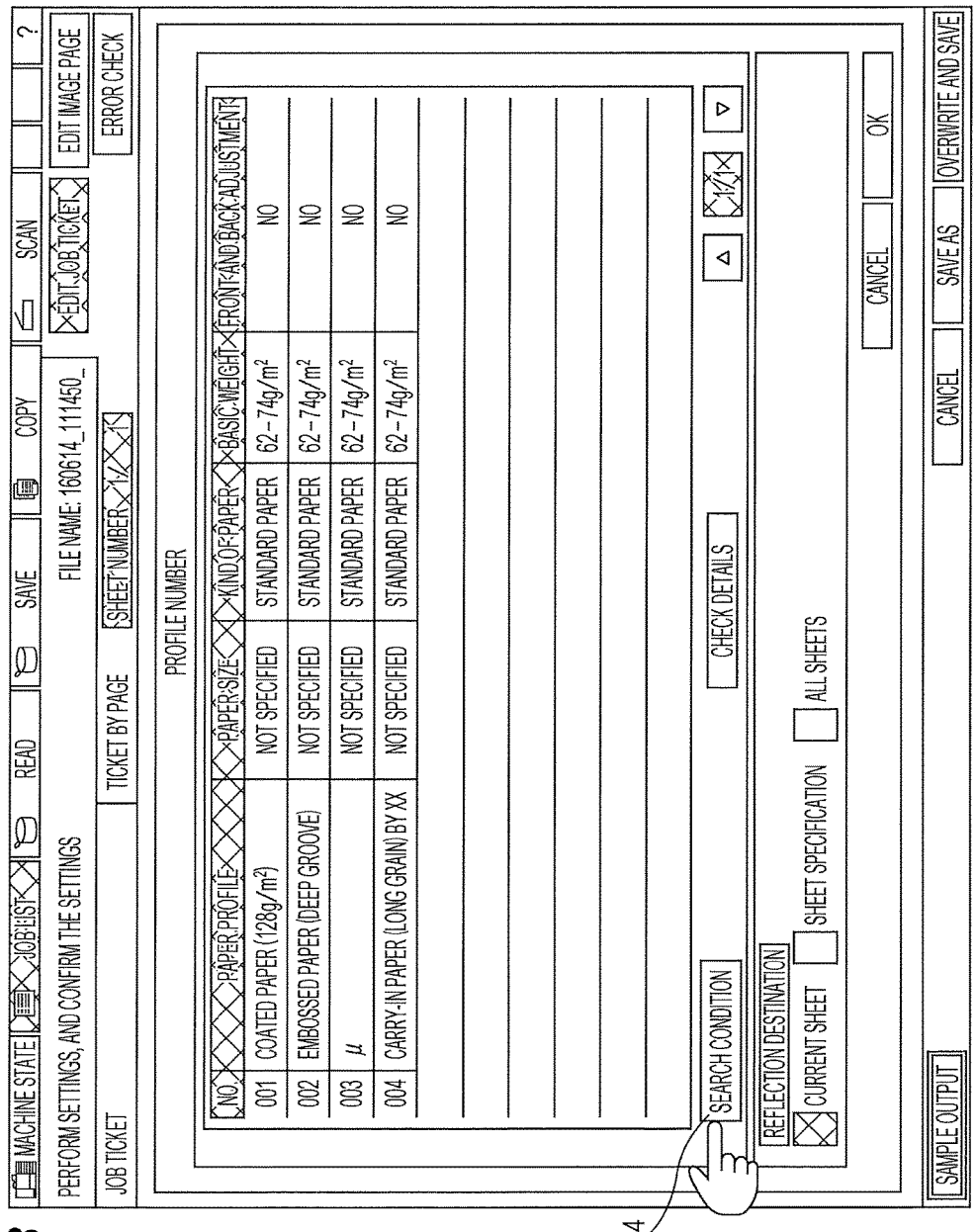
FIG. 8 is a drawing illustrating a list screen that lists paper profiles at the time of job setting.

When a "Job Ticket" button 202 is pressed (selected) on the top screen as indicated by a hand icon (step S12), a job ticket edit screen shown in FIG. 7 is displayed. On the job ticket edit screen, an image of a job is displayed together with, for example, "Basic settings", "Output settings", "Applied settings", "Print settings", "Printing surface", and "Image quality adjustment". On the job ticket edit screen, when a "Profile No." button 203 is pressed (selected) as indicated by a hand icon (step S13), a paper profile list screen shown in FIG. 8 is displayed.

Figure 9:
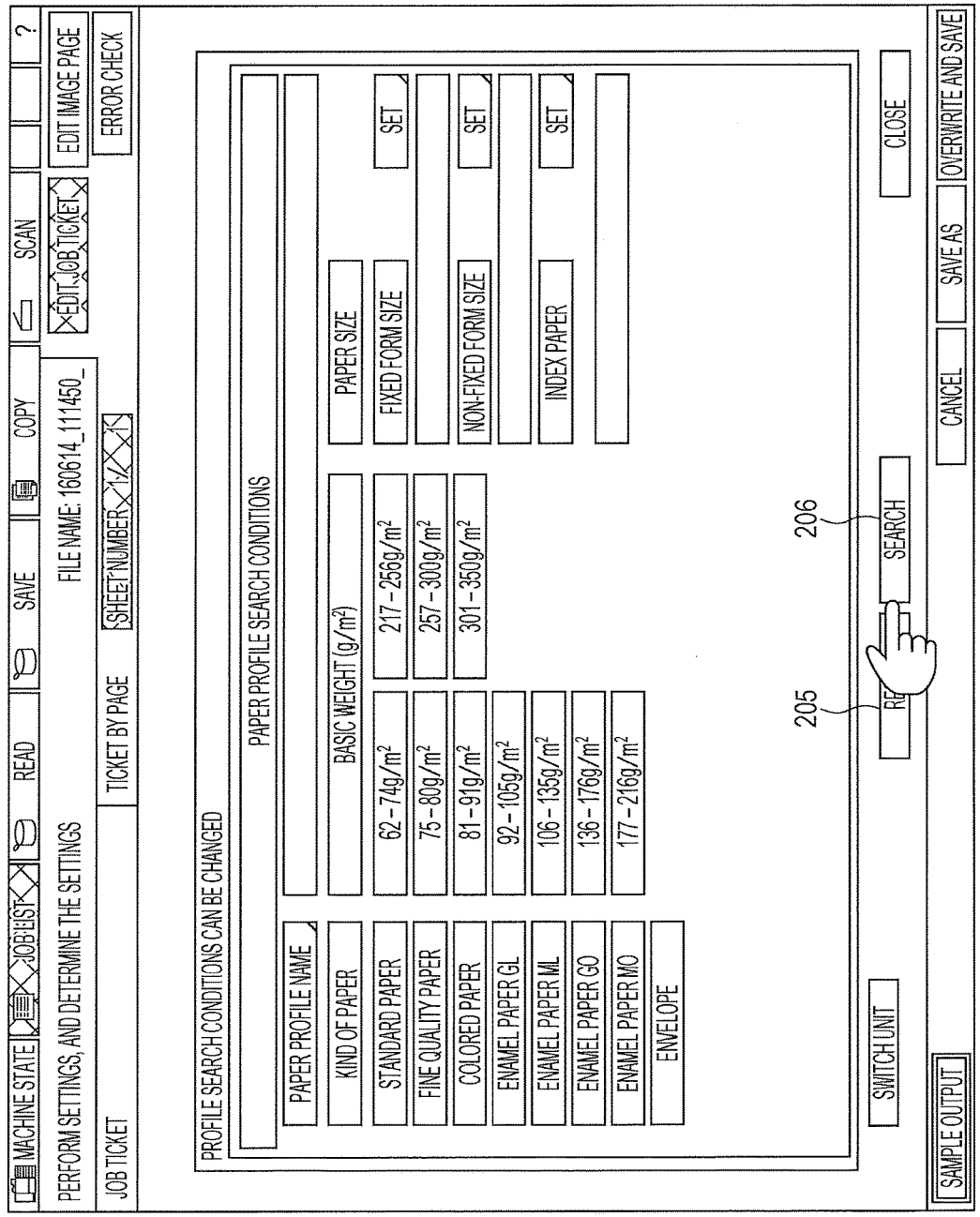
FIG. 9 is a drawing illustrating a refine search screen at the time of job setting.

On the "paper profile list screen", when a "Search Conditions" button 204 is pressed (selected) as indicated by a hand icon (step S14), a refine search screen shown in FIG. 9 is displayed. The refine search screen enables refine search that narrows down search targets by logical AND of the following inputs:

Paper profile name, Partial match (logical OR search is not performed);

Kind of paper (two or more kinds can be selected; in this case, logical OR search);

Basic weight (two or more basic weights can be selected; in this case, logical OR search); and Paper size (two or more paper sizes can be selected; in this case, logical OR search).

When a "Reset" button 205 is pressed (selected) on the refine search screen, the set search state is canceled. In addition, by pressing (selecting) a "Search" button 206, the screen is closed, and a list that matches a specified search key, in other words, listed paper profiles, are called (step S15).

As described above, a refine search that gradually narrows down search targets that match conditions is performed on the paper-profile call screen at the time of job setting. In addition, the refine search uses at least a paper profile name, a kind of paper, and a basic weight as search keys. Specifying two or more search keys enables a logical OR search. This refine search enables a person in charge of prepress to more reliably search for a search target that matches conditions requested by a client.

(Processing at the Time of Tray Setting)

Figure 10:
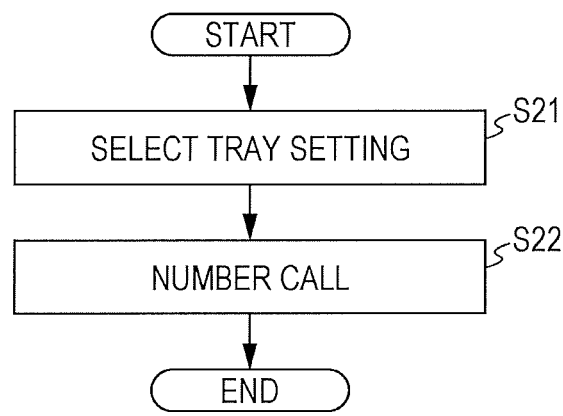
FIG. 10 is a flowchart illustrating the process flow at the time of tray setting by a machine manager.

Next, a process flow at the time of tray setting in which a machine manager (exclusive machine operator) sets a tray will be described with reference to a flowchart shown in FIG. 10. At the time of tray setting, the button operation on the paper-profile call screen is performed by the machine manager.

Figure 13:
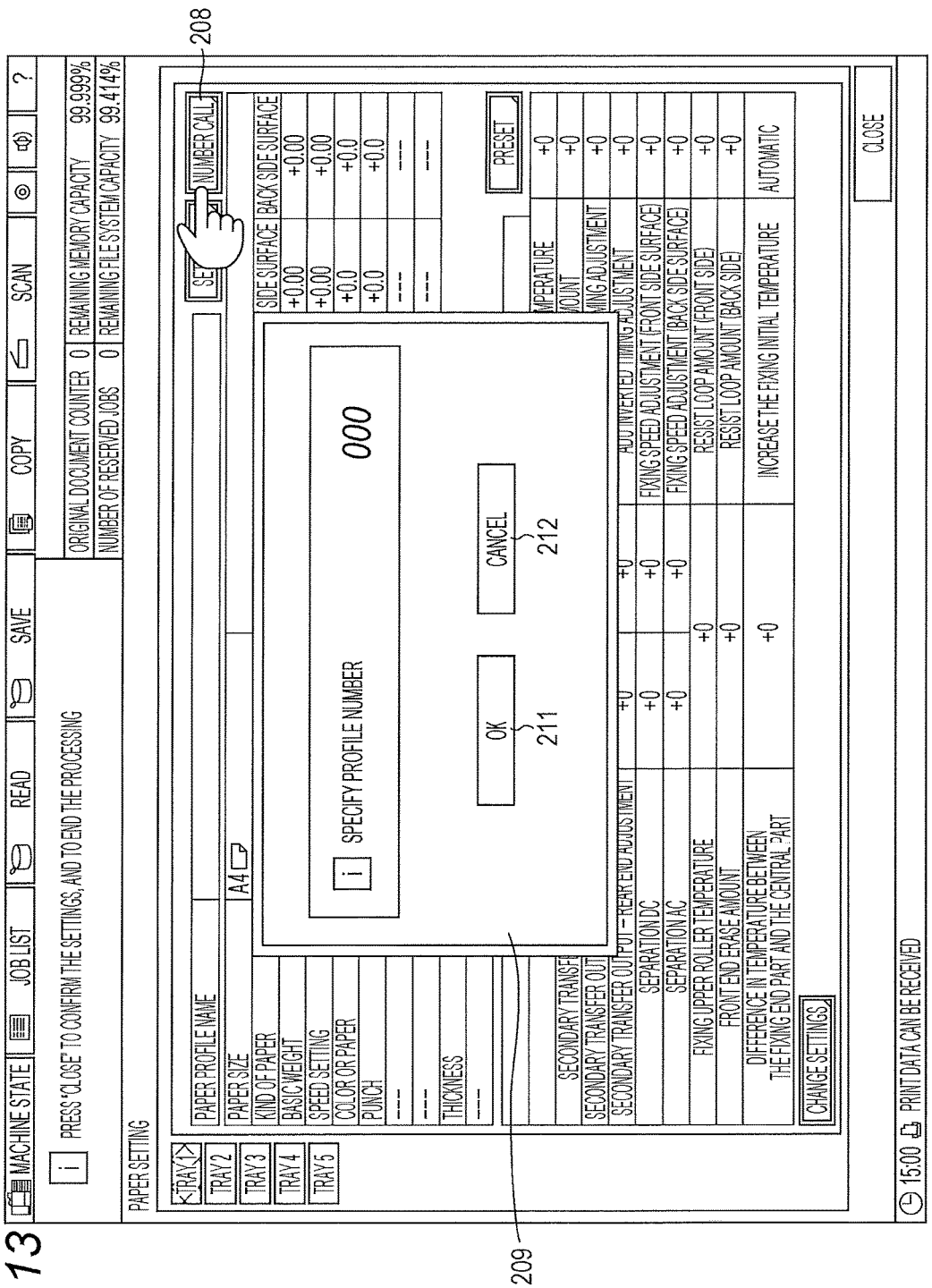
FIG. 13 is a drawing illustrating a number call screen at the time of tray setting.

A tray setting top screen shown in FIG. 11 is displayed in the operation display unit 90. When a "Paper Setting" button 207 is pressed (selected) as indicated by a hand icon on this top screen (step S21), a tray setting screen shown in FIG. 12 is displayed. Subsequently, when a "Number call" button 208 is pressed (selected) as indicated by a hand icon on the tray setting screen (step S22), a number call screen shown in FIG. 13 is displayed. In this case, the number call screen displays a pop-up screen 209 that allows specification of a profile number.

As described above, at the time of tray setting, two or more kinds of paper-profile call screens, for example, two kinds of paper-profile call screens, that is to say, the tray setting screen shown in FIG. 12 and the number call screen shown in FIG. 13, are displayed under the control of the controller 101.

Figure 14:
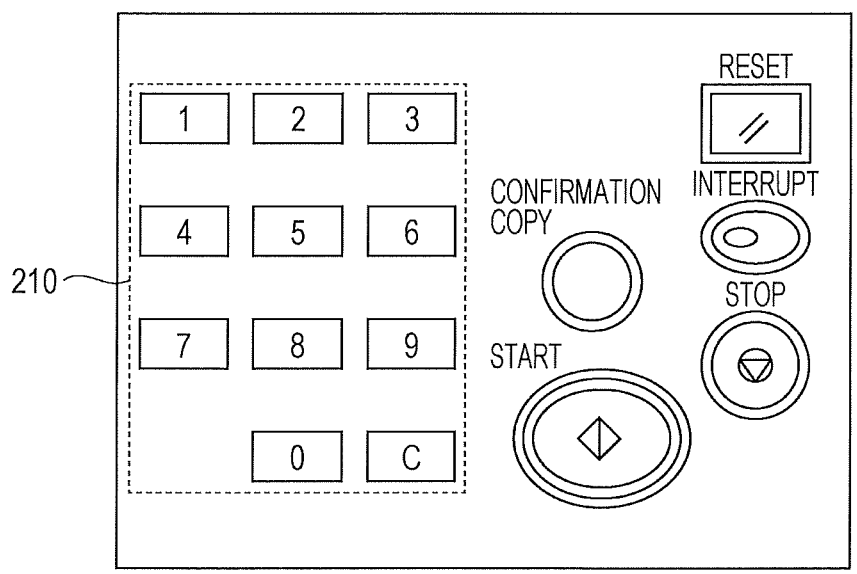
FIG. 14 is a drawing illustrating a hard numeric keypad through which a paper-profile management number is input.

Here, when sheets of paper are managed by paper-profile registration numbers, a paper profile can be directly called by directly specifying a paper-profile registration number on the number call screen. More specifically, as shown in FIG. 14, a paper-profile registration number to be called is inputted by using a hard numeric keypad 210. This direct specification enables the machine manager to call a paper profile described in the print instruction form without a mistake in a short time.

In the pop-up screen 209 on the number call screen shown in FIG. 13, the pop-up screen is closed by pressing (selecting) an "OK" button 211, or by pressing a "Cancel" button 212, as indicated by a hand icon.

In the case of a paper profile that fails to pass a tray prohibition rule, by pressing the "OK" button 211, a one-shot message, for example, "this is a paper profile that cannot be called for a tray", is displayed, and the pop-up screen 209 is kept displayed. In addition, when an unregistered paper profile number is specified, by pressing the "OK" button 211, a one-shot message, for example, "the specified number is not registered", is displayed, and the pop-up screen 209 is kept displayed.

In the above processing at the time of tray setting, a paper profile is directly specified by specifying a paper-profile registration number. However, a paper profile can also be directly specified by specifying, for example, a paper profile name or a bar code. However, the specification of a paper profile is not limited to the specification of the paper-profile registration number, the paper profile name, or the bar code.

[Modification]

Although embodiments of the present invention have been described and illustrated in detail, it is clearly understood that the same is by way of illustration and example only and not limitation, the scope of the present invention should be interpreted by terms of the appended claims. In other words, various kinds of changes or improvements can be made to the above embodiments within the scope that does not deviate from the gist of the present invention, and a mode in which such a change or improvement is made also falls within the technical scope of the present invention.

For example, in the above embodiment, a copying machine is taken as an example of the image forming device 1 according to an embodiment of the present invention. However, the present invention is not limited to this application example. In other words, the present invention can be applied to all kinds of image forming devices, each of which has a paper profile function, including not only a copying machine, but also a printer device, a facsimile device, a printing machine, and a multifunction machine.

The processing in the above embodiment may be carried out by software or by using hardware circuitry In addition, a program that executes the processing in the above embodiment may be provided, or the program may be recorded on a recording medium such as a CD-ROM, a flexible disk, a hard disk, a ROM, a RAM, and a memory card so as to provide the recording medium to a user. The program is executed by a computer such as a CPU. Moreover, the program may be downloaded to a device through a communication line such as Internet.

What is claimed is:

1. An image forming device comprising:
   a hardware processor,
   a display; and
   a keypad,
   wherein the hardware processor is configured to differently display, on the display, items of a paper-profile call screen between at the time of job setting in which a kind of paper is set and at the time of tray setting in which a tray is set,
   wherein at least one item of a paper profile name, a paper-profile registration number, or a bar code is directly specified on the paper-profile call screen at the time of the tray setting,
   wherein the hardware processor is further configured to, when the at least one item on the paper profile call screen at the time of the tray setting is selected,
   display another call screen which allows input of a paper profile name, a paper-profile registration number, or a bar code by a user via the keypad to call a paper profile; and
   perform a job having the paper profile.

2. The image forming device according to claim 1, wherein
   refine search for the paper profile is performed on the paper-profile call screen at the time of the job setting.

3. The image forming device according to claim 2, wherein
   the refine search uses at least a paper profile name, a kind of paper and a basic weight as search keys, and specifying two or more search keys enables a logical OR search.

4. The image forming device according to claim 1, wherein
   the hardware processor is configured to display, on the display, three or more kinds of the paper-profile call screens to be displayed at the time of the tray setting.

5. A control method for controlling an image forming device having a paper profile function of managing characteristics of paper to be used, wherein
   when a paper-profile call screen is displayed in a display, the display differently displays items of the paper-profile call screen between at the time of job setting in which a kind of paper is set and at the time of tray setting in which a tray is set,
   wherein at least one item of a paper profile name, a paper-profile registration number, or a bar code is directly specified on the paper-profile call screen at the time of the tray setting,
   wherein when the at least one item on the paper profile call screen at the time of the tray setting is selected, another call screen is displayed on the display and allows input of a paper profile name, a paper-profile registration number, or a bar code by a user via a keypad to call a paper profile; and a job having the paper profile is performed.

6. The control method according to claim 5, wherein
   refine search for the paper profile is performed on the paper-profile call screen at the time of the job setting.

7. The control method according to claim 6, wherein
the refine search uses at least a paper profile name, a kind of paper and a basic weight as search keys, and specifying two or more search keys enables a logical OR search.

8. The control method according to claim 5, wherein
three or more kinds of the paper-profile call screens are displayed at the time of the tray setting.

9. A non-transitory recording medium storing a computer readable control program of an image forming device having a paper profile function of managing characteristics of paper to be used, wherein
when a paper-profile call screen is displayed in a display, the control program causes the display to differently display items of the paper-profile call screen between at the time of job setting in which a kind of paper is set and at the time of tray setting in which a tray is set,
wherein at least one item of a paper profile name, a paper-profile registration number, or a bar code is directly specified on the paper-profile call screen at the time of the tray setting,
wherein when the at least one item on the paper profile call screen at the time of the tray setting is selected, another call screen is displayed on the display and allows input of a paper profile name, a paper-profile registration number, or a bar code by a user via a keypad to call a paper profile; and a job having the paper profile is performed.

10. The non-transitory recording medium storing a computer readable control program of an image forming device according to claim 9, wherein
the control program performs refine search for the paper profile on the paper-profile call screen at the time of the job setting.

11. The non-transitory recording medium storing a computer readable control program of an image forming device according to claim 10, wherein
the control program uses at least a paper profile name, a kind of paper and a basic weight as search keys for the refine search, and specifying two or more search keys enables a logical OR search.

12. The non-transitory recording medium storing a computer readable control program of an image forming device according to claim 9, wherein
the control program causes three or more kinds of the paper-profile call screens to be displayed at the time of the tray setting.

* * * * *